Patented Mar. 31, 1953

2,633,451

UNITED STATES PATENT OFFICE 2,633,451

PHOTOCHEMICAL PRODUCTION OF 7-BROMOCHOLESTERYL ESTERS

Hermann Schaltegger, Flamatt, Switzerland, assignor to Dr. A. Wander A. G., Berne, Switzerland No Drawing. Application May 22, 1951, Serial No. 227,740

4 Claims. (Cl. 204—158)

According to my U. S. patent application Serial No. 114,691 it was found that 7-bromocholesteryl esters can be obtained by treating cholesteryl esters in carbon tetrachloride with elementary bromine under intense ultraviolet irradiation. By this method 7-bromocholesteryl esters can be obtained in a yield of 45 to 55%.

It has now been discovered that it is possible to obtain yields of 7-bromocholesteryl esters amounting to 70% and over by using for the bromination of the cholesteryl esters 1. Carbon disulphide as solvent instead of carbon tetrachloride and
2. Instead of ultraviolet light, quite generally light which is absorbed by the elementary bromine that is added. The most favourable wavelengths of the light employed are those between 300 and 600 m$\mu$.

Example 1

49 gm. ($\frac{1}{10}$ mol) of cholesteryl benzoate are heated to boiling point in 1.1 litres of pure, mercaptan-free carbon disulphide. A solution of 16 gm. of bromine ($\frac{2}{10}$ gram-atoms) in 500 c. c. of carbon disulphide is added to the gently boiling mixture under simultaneous irradiation with 4 200 w. lamps within a period of 25 minutes. Following bromination and the customary subsequent processing, 51 gm. of crude 7-bromocholesteryl benzoate are obtained, containing 80% of 7-bromocholesteryl benzoate. This amounts to a total yield of 71.6% of the theoretical value, in relation to cholesteryl benzoate. By recrystallisation from isopropyl ether pure 7-bromocholesteryl benzoate is obtained which boils at 142–143° and has an optical rotation of $(\alpha)_D^{20} = -186°$.

Example 2

9.8 gm. of cholesteryl benzoate are dissolved in 200 c. c. of carbon disulphide and heated to boiling point. A mixture of 10 vol. per cent bromine and 90 vol. per cent nitrogen is introduced into the boiling solution under irradiation with "Daylight-lamps" which are dipped into the solution that is to be brominated. The addition of bromine and nitrogen gas is regulated in such a manner that 3.2 gm. of bromine are consumed within 15 minutes. Following the customary processing, 9.2. gm. of the crude product are obtained, containing 78% of 7-bromocholesteryl benzoate.

Example 3

50 gm. of cholesteryl toluol sulfonate and 1200 c. c. of carbon disulphide are brominated with 14.8 gm. of bromine in 500 c. c. of carbon disulphide within 21 minutes, in the same manner as indicated in Example 1. Following removal of the carbon displphide in a vacuum, the resin was treated with 120 c. c. of benzene. By this procedure 23.3. gm. of a product were obtained which melts at 100 to 105° and has an optical rotation of $(\alpha)_D^{21} = -106°$. After recrystallisation from petroleum ether acetone, 10.1 gm. of 7-bromocholesteryl toluol sulfonate were obtained having a melting point of 109–110°.

What I claim is:

1. A process which comprises subjecting cholesteryl ester dissolved in carbon disulphide to the action of bromine while irradiating the reaction medium with light of a wavelength between 300 and 600 m$\mu$ so as to produce 7-bromocholesteryl ester.

2. A process in accordance with claim 1, wherein the cholesteryl ester is subjected to the action of a solution of bromine in carbon disulphide.

3. A process in accordance with claim 1, wherein the cholesteryl ester is subjected to the action of bromine mixed with an inert gas.

4. A process in accordance with claim 3, wherein the inert gas is nitrogen.

HERMANN SCHALTEGGER.

REFERENCES CITED

The following references are of record in the file of this patent:

UNITED STATES PATENTS

| Number | Name | Date |
|---|---|---|
| 2,452,154 | Ross | Oct. 26, 1948 |
| 2,498,390 | Bernstein et al. | Feb. 21, 1950 |
| 2,590,637 | Miescher et al. | Mar. 25, 1952 |

FOREIGN PATENTS

| Number | Country | Date |
|---|---|---|
| 544,051 | Great Britain | Mar. 25, 1942 |